No. 763,891. PATENTED JUNE 28, 1904.
C. HESSE.
HARVESTER.
APPLICATION FILED AUG. 22, 1903.
NO MODEL. 2 SHEETS—SHEET 1.
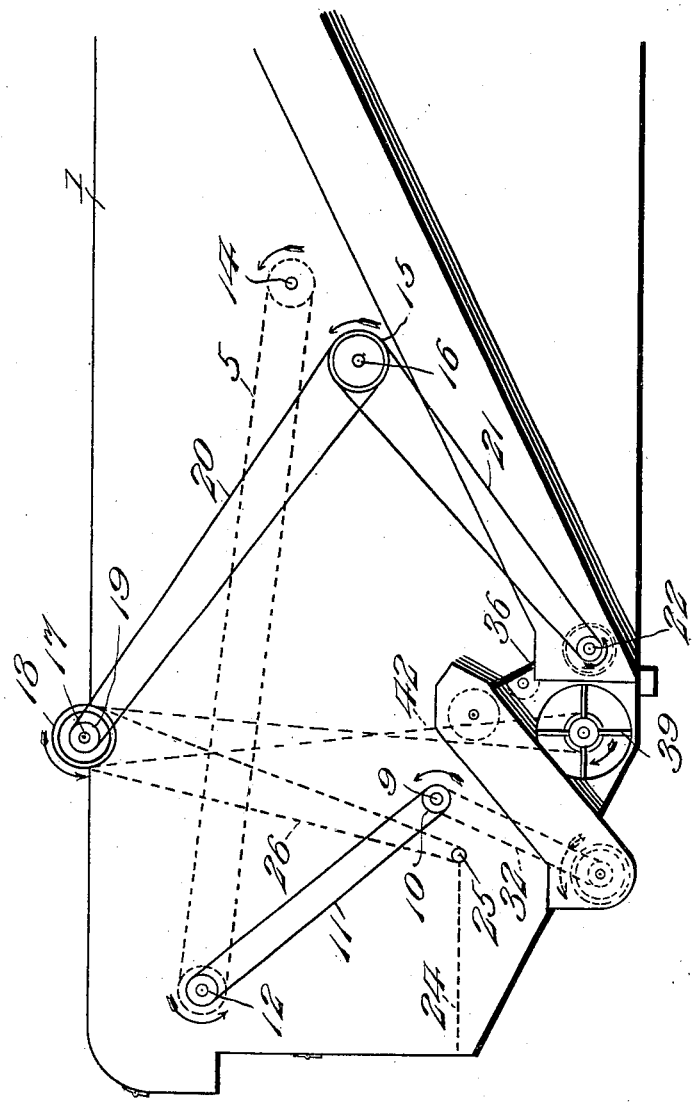
Witnesses
Inventor
Charles Hesse,
By Victor J. Evans
Attorney No. 763,891. PATENTED JUNE 28, 1904.
C. HESSE.
HARVESTER.
APPLICATION FILED AUG. 22, 1903.
NO MODEL. 2 SHEETS—SHEET 2.
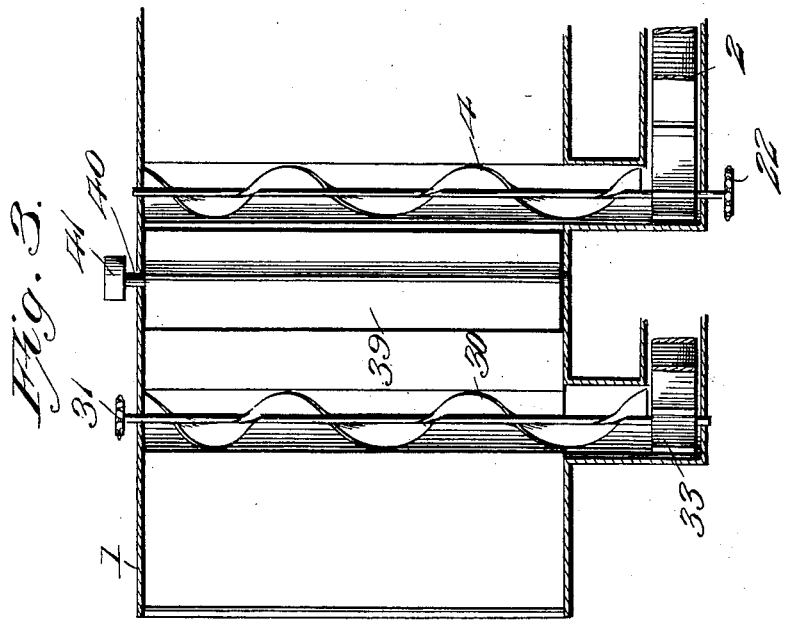
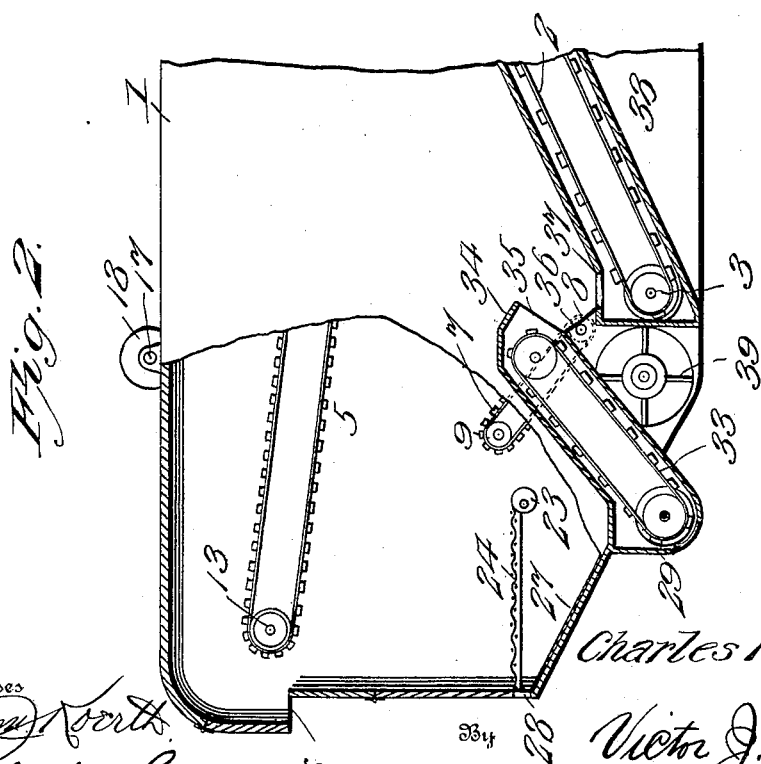
Inventor
Charles Hesse,
Witnesses
By Victor J. Evans
Attorney No. 763,891. Patented June 28, 1904.

UNITED STATES PATENT OFFICE.

CHARLES HESSE, OF REDBLUFF, CALIFORNIA.

HARVESTER.

SPECIFICATION forming part of Letters Patent No. 763,891, dated June 28, 1904.

Application filed August 22, 1903. Serial No. 170,481. (No model.)

*To all whom it may concern:*

Be it known that I, CHARLES HESSE, a citizen of the United States, residing at Redbluff, in the county of Tehama and State of California, have invented new and useful Improvements in Harvesters, of which the following is a specification.

My invention relates to new and useful improvements in harvesters; and its object is to provide a grain-saving attachment by means of which any grain which may be discharged with the straw and chaff will be recovered and refed to the cleaning mechanism of the harvester and ready for sacking.

With the above and other objects in view the invention consists in the novel construction and combination of parts hereinafter more fully described and claimed, and illustrated in the accompanying drawings, showing the preferred form of my invention, and in which—

Figure 1 is a side elevation of the rear portion of a harvester having my improved attachment used in connection therewith and showing in dotted lines the chains and belts arranged at either side of the machine. Fig. 2 is a section through the casings of the elevators of the attachment and having one portion of the side broken away to show the mechanism contained therein, and Fig. 3 is a horizontal section showing in plan the worms and fan of the apparatus.

Referring to the figures by numerals of reference, 1 is the casing of a harvester having the ordinary main carrier 2 arranged at one side thereof and connected to the end of a shaft 3, with which rotates a worm 4, extending transversely of the casing adjacent the main shoe. (Not shown.) A straw-carrier is located within the casing 1, near the upper portion thereof, and is adapted to conduct the straw to an outlet 6. The parts herein described are those employed in harvesters of the ordinary construction. My invention consists of certain additional parts adapted to be used in connection therewith. It comprises a tailer or conveyer 7, which is arranged within the casing 1 at a point above the worm 4 and the main shoe, and this tailer is mounted on shafts 8 and 9, one of which, 9, is provided with a sprocket 10, upon which is arranged a chain 11, which extends over a sprocket 12, connected to one shaft 13, of the straw-carrier 5. This straw-carrier receives its power from its other shaft, 14, which is arranged at the opposite end thereof.

Sprockets 15 are fastened in any suitable manner to a power-shaft 16, and a shaft 17 is journaled upon the casing 1, and pulleys 18 and a sprocket 19 are connected thereto. A chain 20 is utilized for transmitting motion from one of the sprockets 15 to the sprocket 19, and another chain 21 connects a sprocket 15 with a sprocket 22, connected to the shaft 3 of the worm 4.

An eccentric 23 is arranged within the casing 1 and is connected to one end of a screen 24 and is adapted when rotated to impart a reciprocating motion to said screen. This eccentric has a pulley 25 connected thereto, which is driven by a belt 26, arranged on one of the pulleys 18. An inclined board 27 is arranged under screen 24, and at its upper end is an outlet-opening 28. A channel 29 is formed within this inclined board and extends transversely thereof, and within the channel is revolubly mounted a worm 30, having a sprocket 31 upon one end thereof, which is connected by a chain 32 with the sprocket 10, hereinbefore referred to. A conveyer or elevator 33 extends upward from one end of the channel 29 and is inclosed by a casing 34, having an outlet 35, through which material carried by the elevator is adapted to be discharged upon an inclined board 36, which extends downward into an aperture 37, formed in the top of the casing 38 of the main carrier 2. A fan 39 extends transversely of the casing 1, between the worms 30 and 4, and is adapted to direct a blast of air along the inclined board 27, so as to drive all chaff and other extremely light particles discharged through the screen 24 outward through the aperture 28. The shaft 40 of this fan 39 has a pulley 41 thereon, to which rotary motion is transmitted from one of the pulleys 18 by a crossed belt 42.

The operation of the apparatus is as follows: The grain and chaff is directed from the main shoe of the machine to the tailer or conveyer 7 and is conducted thereby upward upon the screen 24. The arrangement of belts, chains, and pulleys will, as is obvious, cause the eccentric 23 to rotate when the power-shaft 16 is revolved, and a reciprocating motion is thus transmitted to said screen, and the chaff and grain deposited upon it is caused to drop therethrough and upon the inclined board 27. This board will direct it to the channel 29, where it will be gathered by the worm 30 and carried to the conveyer 33. This conveyer will draw the material upward to the outlet 35 of the casing 34, from which it will be discharged to the board 36 and into casing 38. The main carrier 2 within this casing will conduct the grain back to the machine, where it can be cleaned and sacked, as ordinarily. The fan 39 will, as is obvious, be rotated by belt 42 and will blow through the outlet 28 all chaff falling from the screen 24.

By providing an attachment such as herein described a large saving of grain is made without adding materially to the cost of the machine or the power required to operate it.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

The combination with a harvester having an apertured casing, a main carrier, and a casing inclosing the carrier and having an inlet; of a conveyer within the first-mentioned casing and at one side of the main carrier, a reciprocating screen adapted to be fed by the conveyer, an inclined board under the screen, said screen and board extending from the aperture in the harvester-casing, a fan adapted to direct an air-current along the board and through the aperture, a revoluble worm within a channel extending transversely of the board and out of the path of the air-current, an elevator extending from and operated by the worm, and an inclined board for directing material from the elevator to the inlet in the casing of the main carrier.

In testimony whereof I affix my signature in presence of two witnesses.

CHARLES HESSE.

Witnesses:
 GEO. H. KRAFT,
 ROLLA FULLER.